US006884162B2

(12) United States Patent
Raverdy et al.

(10) Patent No.: US 6,884,162 B2
(45) Date of Patent: Apr. 26, 2005

(54) SYSTEM AND METHOD TO SUPPORT GAMING IN AN ELECTRONIC NETWORK

(75) Inventors: Pierre-Guillaume Raverdy, Santa Clara, CA (US); Nigel A. J. Davies, Hala (GB); Oliver D. Storz, Sankt Georgen (DE); Christos Efstratiou, Lancaster (GB)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/904,385

(22) Filed: Jul. 12, 2001

(65) Prior Publication Data

US 2002/0068631 A1 Jun. 6, 2002

Related U.S. Application Data

(60) Provisional application No. 60/250,944, filed on Dec. 1, 2000, and provisional application No. 60/250,947, filed on Dec. 1, 2000.

(51) Int. Cl.[7] ................................................ A63F 13/00
(52) U.S. Cl. ............................................ 463/1; 463/42
(58) Field of Search ........................ 463/40–44, 23–26, 463/1; 709/230, 222, 297, 203, 219, 227

(56) References Cited

U.S. PATENT DOCUMENTS

| | | | | | |
|---|---|---|---|---|---|
| 5,083,800 | A | * | 1/1992 | Lockton | 463/41 |
| 5,280,426 | A | * | 1/1994 | Edmonds | 273/138.2 |
| 5,326,104 | A | * | 7/1994 | Pease et al. | 273/269 |
| 5,575,474 | A | * | 11/1996 | Rossides | 463/26 |
| 5,779,549 | A | * | 7/1998 | Walker et al. | 463/23 |
| 5,947,825 | A | * | 9/1999 | Horstmann et al. | 463/42 |
| 6,085,176 | A | * | 7/2000 | Woolston | 705/37 |
| 6,168,522 | B1 | * | 1/2001 | Walker et al. | 463/25 |
| 6,200,216 | B1 | * | 3/2001 | Peppel | 463/1 |
| 6,202,051 | B1 | * | 3/2001 | Woolston | 705/27 |
| 6,351,773 | B1 | * | 2/2002 | Fijolek et al. | 463/17 |
| 6,389,402 | B1 | * | 5/2002 | Ginter et al. | 380/201 |
| 6,409,602 | B1 | * | 6/2002 | Wiltshire et al. | 463/16 |
| 6,471,068 | B1 | * | 10/2002 | Kido et al. | 707/103 R |
| 6,510,513 | B1 | * | 1/2003 | Danieli | 713/156 |
| 6,591,250 | B1 | * | 7/2003 | Johnson et al. | 705/51 |
| 2001/0039206 | A1 | * | 11/2001 | Peppel | |
| 2001/0056383 | A1 | * | 12/2001 | Shuster | 705/27 |
| 2002/0169706 | A1 | * | 11/2002 | Chandra et al. | |

OTHER PUBLICATIONS

Ultima Online Brokering, http://uo.tradespot.net/html.php-?brokerfaq, circa 1999.*

* cited by examiner

*Primary Examiner*—Michael O'Neill
(74) *Attorney, Agent, or Firm*—Gregory J. Koerner; Redwood Patent Law

(57) ABSTRACT

A system and method to support electronic gaming in an electronic network includes an event server that provides restricted access to various types of game services. One or more system users may utilize corresponding wireless portable user devices for connecting to the event server to thereby gain access to the foregoing game services as game participants. The system users may thereby utilize the user devices to access the event server for accessing appropriate gaming services and related information. In addition, a source system user may utilize a source user device to perform a transfer procedure for transferring ownership rights of an electronic certificate related to the electronic gaming to a target system user through a target user device. The foregoing transfer procedure may be conducted through the event server, or may occur directly from the source user device to the target user device.

39 Claims, 11 Drawing Sheets

110

SYSTEM AND METHOD TO SUPPORT GAMING IN AN ELECTRONIC NETWORK

CROSS-REFERENCE TO RELATED APPLICATIONS

This application relates to, and claims priority in, U.S. Provisional Patent Application Ser. No. 60/250,944, entitled "Infrastructure To Enhance User Experience At Live Events," filed on Dec. 1, 2000, and to U.S. Provisional Patent Application Ser. No. 60/250,947, entitled "Video Streaming To Personal Wireless Devices For Live Event Enhancement," filed on Dec. 1, 2000. The foregoing related applications are commonly assigned, and are hereby incorporated by reference.

BACKGROUND SECTION

1. Field of the Invention

This invention relates generally to techniques for providing electronic entertainment, and relates more particularly to a system and method to support gaming in an electronic network.

2. Description of the Background Art

Implementing effective methods for providing entertainment to system users is a significant consideration for designers and manufacturers of contemporary electronic devices. However, providing various types of user entertainment with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively accesses, stores, displays, and manipulates digital image data may benefit from an efficient implementation because of the large amount and complexity of the digital data involved.

Due to growing demands on system resources and substantially increasing data magnitudes, it is apparent that developing new techniques for providing user entertainment is a matter of concern for related electronic technologies. Therefore, for all the foregoing reasons, developing effective systems for providing user entertainment remains a significant consideration for designers, manufacturers, and users of contemporary electronic devices.

SUMMARY

In accordance with the present invention, a system and method are disclosed to support gaming in an electronic network. In one embodiment, an electronic system may preferably include, but is not limited to, one or more user devices, a base station, a local area network (LAN), an event server, and an Internet network. The user devices may preferably be implemented as any appropriate type of electronic device. For example, the user devices may be configured as portable wireless telecommunications devices.

In certain embodiments, the user devices may preferably communicate bidirectionally with the base station which may include a radio-frequency transceiver system to transmit and receive wireless communications to and from the user devices. The base station may preferably be coupled to the LAN which may preferably be implemented at a particular event location.

During the utilization of the foregoing embodiment, system users may preferably utilize user devices to access a game service for a particular game on the event server. In response, the user devices may preferably receive a listing of current game participants from the event server. Then, the system users may utilize the user devices to participate in the particular game that is supported by the game service.

When appropriate, the system users may preferably utilize the user devices to determine whether any game fees are required, and may preferably pay game fees using any appropriate means. For example, the system users may utilize the user devices to pay game fees through the event server. In certain embodiments, paying the foregoing game fees may preferably include paying for various types of gambling activities such as placing wagers or otherwise betting on aspects of a game supported by the game service. System users may also utilize a similar technique for gambling on various aspects of a particular live event.

The event server may periodically determine whether selected award criteria have been satisfied for awarding a game prize to one or more system users of the user devices. If the award criteria have been satisfied, then the event server may preferably award a prize certificate to appropriate system users through their respective user devices.

In certain embodiments, a source system user may utilize a source user device to access a trading service for performing a transfer procedure to transfer one or more electronic certificates to a target system user through a target user device. In accordance with the present invention, the system users may perform the foregoing transfer procedure in any effective manner. For example, the transfer procedure may be conducted indirectly through the event server, or may be conducted directly from the source user device to the target user device.

The source system user may preferably utilize the source user device to locate and connect with the target system user through the target user device. In accordance with the present invention, locating and connecting with a trading partner may occur either face-to-face or remotely through the event server. The system users may then preferably negotiate satisfactory trade terms for the transfer procedure. Again, negotiating trade terms may occur either face-to-face or remotely through the event server.

Next, the system users may preferably utilize the source user device and the target user device to formally accept the trade terms that were previously negotiated. The source user device and the target user device may preferably determine whether current security provisions are adequate for completing the transfer procedure. For example, the source user device and the target user device may determine whether appropriate versions of encryption software are currently installed to support the transfer procedure.

If current security provisions are not adequate for completing the transfer procedure, then the source user device and the target user device may preferably obtain adequate security provisions for the transfer procedure. For example, the source user device and the target user device may access the event server or another entity to download appropriate encryption software for performing the transfer procedure.

Then, the source user device and the target user device may preferably complete the transfer procedure by transferring ownership rights of the particular certificate from the source system user via the source user device to the target system user through the target user device. The transferred certificate may be updated to reflect the change of ownership rights. The present invention thus provides an improved system and method to support gaming in an electronic network.

DETAILED DESCRIPTION

The present invention relates to an improvement in information management techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method to support electronic gaming, and preferably includes an event server that provides restricted access to various types of game services. One or more system users may utilize corresponding wireless portable user devices for connecting to the event server to thereby gain access to the foregoing game services as game participants. The system users may thereby utilize the user devices to access the event server for accessing appropriate gaming services and related information. In addition, source system user may utilize a source user device to perform a transfer procedure for transferring ownership rights of an electronic certificate related to the electronic gaming to a target system user through a target user device. The foregoing transfer procedure may be conducted through the event server, or may occur directly from the source user device to the target user device.

Figure 1:
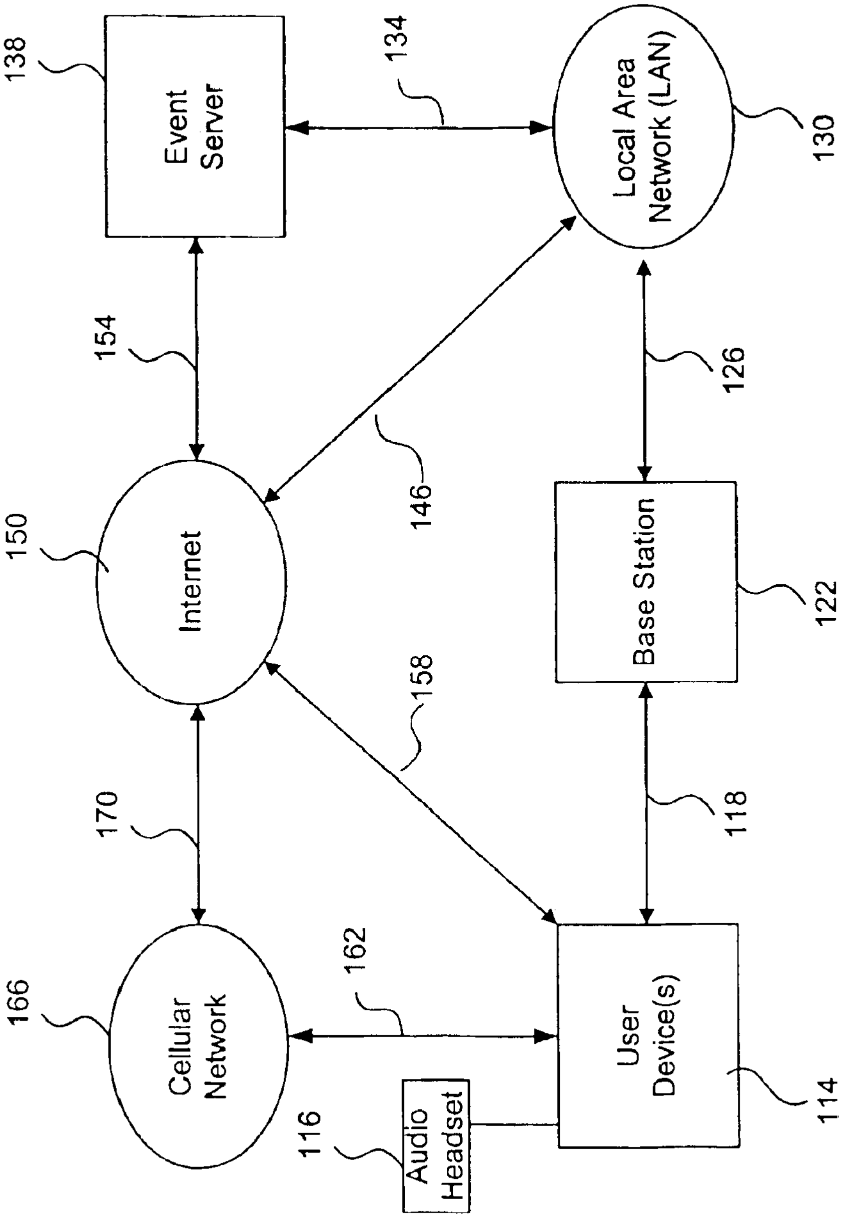
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may preferably include, but is not limited to, one or more user device(s) 114, a base station 122, a local area network (LAN) 130, an event server 138, an Internet network 150, and a cellular network 166. In alternate embodiments, electronic system 110 may readily be implemented using various components and configurations in addition to, or instead of, those discussed in conjunction with the FIG. 1 embodiment. For example, in certain embodiments, electronic system 110 may readily be configured to include multiple base stations 122 and/or multiple event servers 138.

In the FIG. 1 embodiment, user devices 114 may preferably be implemented as any appropriate type of electronic device. For example, user devices 114 may be configured as a portable wireless telecommunications device. The configuration and functionality of user devices 114 is further discussed below in conjunction with FIGS. 2 and 3.

In the FIG. 1 embodiment, user devices 114 may preferably communicate bidirectionally with base station 122 via path 118. Base station 122 may preferably be implemented in any appropriate manner. For example, base station 122 may include a radio-frequency transceiver system to transmit and receive wireless communications to and from user device 114. Base station 122 may preferably be coupled to LAN 130 via path 126.

In the FIG. 1 embodiment, LAN 130 may preferably be implemented at a particular event location. For example, LAN 130 and base station 122 may be located at a shopping mall, a school, or a sporting venue. In certain embodiments, electronic system 110 may include multiple base stations 122 coupled to one or more different LANs 130. For example, a movie theater may include an entrance LAN 130 outside the theater, a lobby LAN 130 in the theater lobby, and a screening room LAN 130 for the area in which movies are displayed.

In the FIG. 1 embodiment, LAN 130 may preferably communicate directly with event server 138 via path 134. Event server 138 may preferably include various types of event services or event information related to a particular event or event location. For example, event server 138 may include various types of gaming services. In certain embodiments, LAN 130 may preferably include a computer device (not shown) for connecting to Internet 150 via path 146. Internet 150 may then responsively communicate with event server 138 via path 154. The implementation and functionality of event server 138 is further discussed below in conjunction with FIGS. 5 and 6.

In accordance with the present invention, user devices 114 may thus access relevant event information from event server 138 via base station 122 and LAN 130. In certain circumstances, user devices 114 may also communicate directly with Internet 150 via path 158 to access event server 138. For example, user devices 114 may be utilized to access event server 138 before or after attending a particular event location. In addition, user devices 114 may also communicate with cellular network 166 via path 162 to thereby access Internet 150 and event server 138 via path 170.

In the FIG. 1 embodiment, each of user devices 114 may also communicate directly with other user devices 114 to perform various types of procedures. For example, a pair of user devices 114 may perform a transfer procedure by directly communicating with each other through a wireless communication link or a through physical interface. The foregoing transfer procedure is further discussed below in conjunction with FIG. 11.

Figure 2:
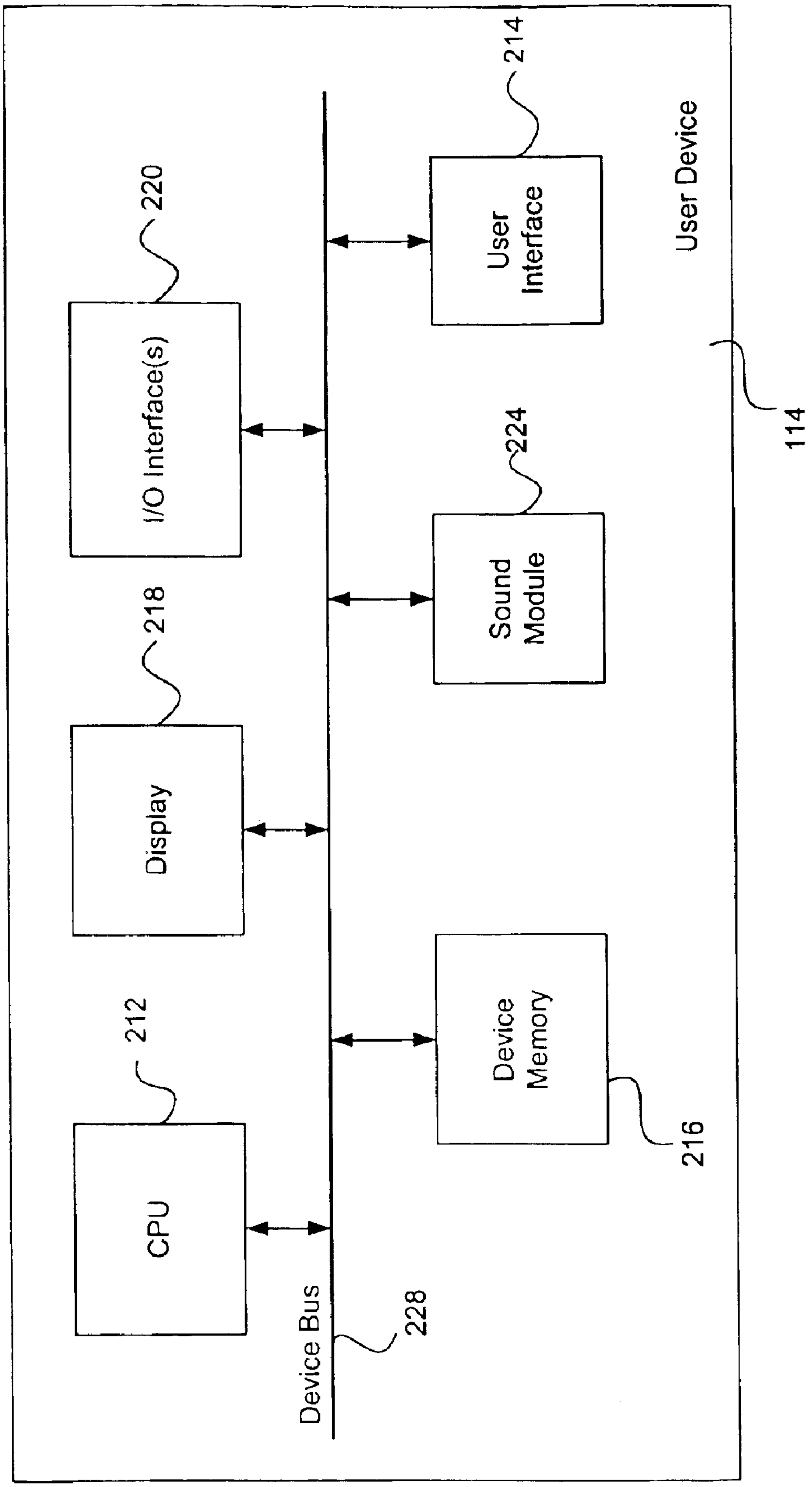
FIG. 2 is a block diagram for one embodiment of the user device of FIG. 1, in accordance with the present invention.

Referring now to FIG. 2, a block diagram for one embodiment of the FIG. 1 user devices 114 is shown, in accordance with the present invention. In the FIG. 2 embodiment, a user device 114 preferably includes, but is not limited to, a central processing unit (CPU) 212, a user interface 214, a device memory 216, a display 218, one or more input/output interface(s) (I/O interface(s)) 220, and a sound module 224. The foregoing components of user device 114 may preferably be coupled to, and communicate through, a device bus 228.

In alternate embodiments, user device 114 may readily be implemented using various components and configurations in addition to, or instead of, those discussed in conjunction with the FIG. 2 embodiment. In addition, user device 114 may be implemented as any desired type of electronic device. For example, in certain embodiments, user device 114 may include a personal digital assistant (PDA) device, a cellular telephone device, a computer device, or any portable electronic device that supports wireless electronic communications.

In the FIG. 2 embodiment, CPU 212 may be implemented to include any appropriate and compatible microprocessor device that preferably executes software instructions to thereby control and manage the operation of user device 114. The FIG. 2 display 218 preferably may include any effective type of display technology including a cathode-ray-tube monitor or a liquid-crystal display device.

In the FIG. 2 embodiment, I/O interface(s) 220 preferably may include one or more input and/or output interfaces to receive and/or transmit any required types of information by user device 114. For example, in the FIG. 2 embodiment, user device 114 may utilize I/O interface(s) 220 to bi-directionally communicate with various types of wireless communications devices through a wireless communications interface. The wireless communications interface may preferably include any effective means to remotely communicate with an external entity such as LAN 130 (FIG. 1), Internet 150, or other user devices 114, to thereby exchange relevant information for successful operation of user device 114.

In addition, user device 114 may utilize the wireless communications interface to download various types of content information and other data from a wireless source such as base station 122 (FIG. 1). The foregoing wireless communications interface may be implemented using any appropriate wireless technology, including radio-frequency transmission, infrared transmission, or microwave transmission.

In the FIG. 2 embodiment, user device 114 may also utilize I/O interface(s) 220 to bi-directionally communicate with one or more distributed computer networks. For example, user device 114 may advantageously communicate with the Internet, a local area network, or other distributed computer networks to upload or download various types of information.

User device 114 may also utilize I/O interface(s) 220 to bi-directionally communicate with a host computer. For example, user device 114 may communicate with a personal computer device over a Universal Serial Bus (USB) to effectively upload or download various types of information. Similarly, in the FIG. 2 embodiment, user device 114 may utilize I/O interface(s) 220 to bi-directionally communicate with a cellular telephone network to preferably transfer any desired information.

In the FIG. 2 embodiment, one or more removable storage media interfaces may preferably be utilized to receive or send any desired data for user device 114. For example, various types of removable storage media may provide means for bi-directional transfers of content information and other data between user device 114 and other appropriate entities. In certain embodiments, the removable storage media may include memory devices to support any desired type or combination of removable storage media. For example, the removable storage media may support memory sticks, flash memory devices, compact disks, mini-disks, or floppy disks.

In the FIG. 2 embodiment, device memory 216 may be implemented to include any combination of desired storage devices, including, but not limited to, read-only memory (ROM), random-access memory (RAM), and various types of non-volatile memory, such as floppy disks or hard disks. The contents and functionality of device memory 216 are further discussed below in conjunction with FIG. 3.

Sound module 224 preferably may include appropriate interfaces to support audio functionality for user device 114. For example, in certain embodiments, sound module 224 may include, but is not limited to, an audio processing module, a power amplifier, one or more speaker devices, and a microphone device. In the FIG. 2 embodiment, sound module may preferably include a headset device to be worn by a system user for voice communications with other system users in electronic network 110.

In the FIG. 2 embodiment, user interface 214 may preferably include any effective means to allow a system user to communicate with user device 114. For example, user interface 214 may support a keyboard device, a wireless remote control device, a speech-recognition module with corresponding microphone, a graphical user interface with touch-screen capability, or a selection button array mounted externally on user device 114. The functionality and utilization of user device 114 is further discussed below in conjunction with FIGS. 9 through 11.

Figure 3:
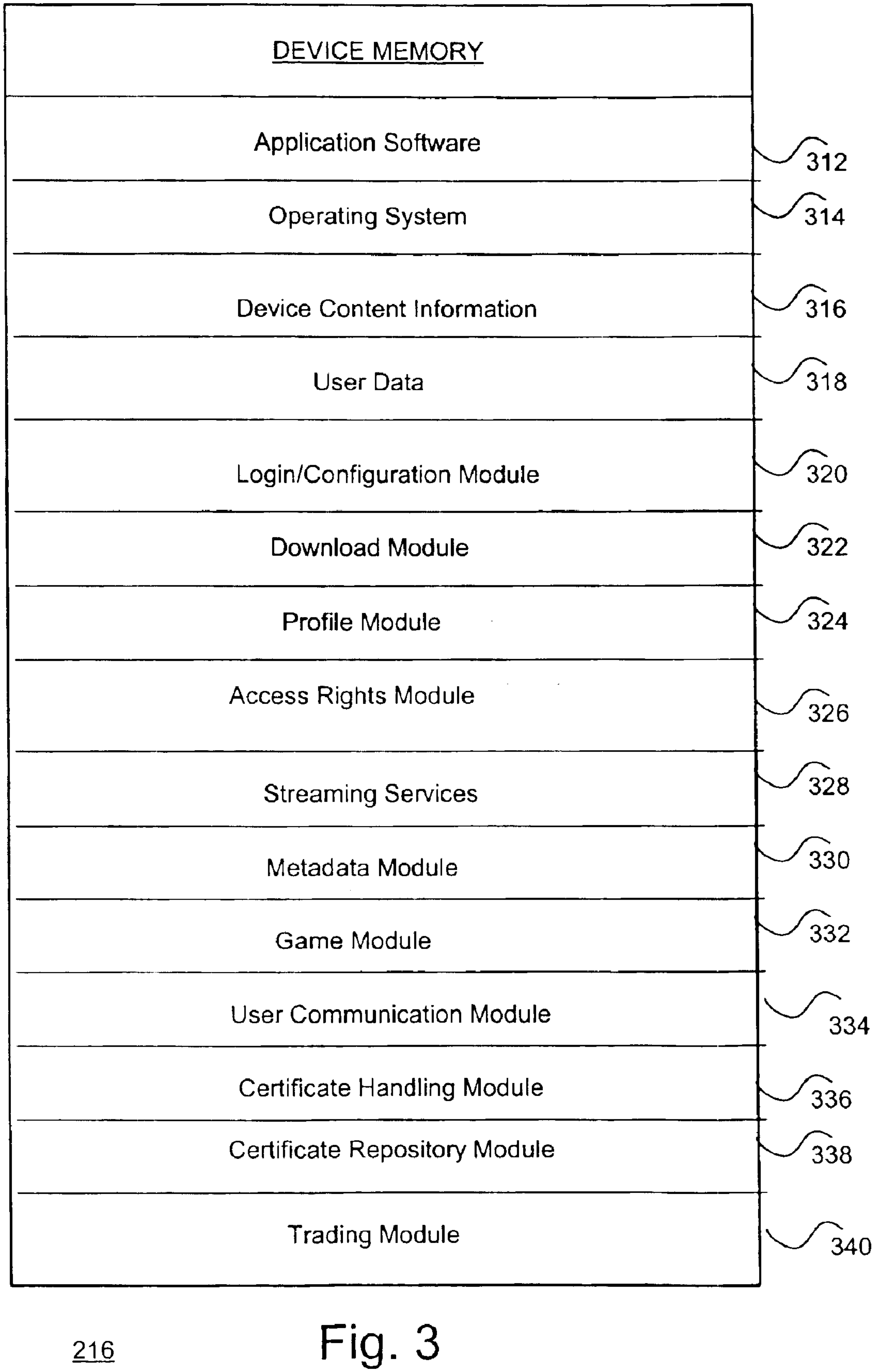
FIG. 3 is a block diagram for one embodiment of the device memory of FIG. 2, in accordance with the present invention.

Referring now to FIG. 3, a block diagram for one embodiment of the FIG. 2 device memory 216 is shown, in accordance with the present invention. In the FIG. 3 embodiment, device memory 216 preferably includes, but is not limited to, application software 312, an operating system 314, device content information 316, user data 318, a login/configuration module 320, a download module 322, a profile module 324, an access rights module 326, streaming services 328, a metadata module 330, a game module 332, a user communication module 334, a certificate handling module 336, a certificate repository module 338, and a trading module 340. In alternate embodiments, device memory 216 may readily include various other components in addition to, or instead of, those components discussed in conjunction with the FIG. 3 embodiment.

In the FIG. 3 embodiment, application software 312 may include program instructions that are preferably executed by CPU 212 (FIG. 2) to perform various functions and operations for user device 114. The particular nature and functionality of application software 312 preferably varies depending upon factors such as the specific type and particular use of the corresponding user device 114. In the FIG. 3 embodiment, operating system 314 preferably controls and coordinates low-level functionality of user device 114. Device content information 316 preferably includes various types of data that is preferably stored in device memory 216. Device content information 316 preferably may include various types of image data or other types of information.

User data 318 may preferably include any information pertaining to the utilization of user device 114 by one or more system users. User data 318 is further discussed below in conjunction with FIG. 4.

In the FIG. 3 embodiment, login/configuration module 320 may preferably initiate bi-directional communications between user device 114 and another entity in electronic system 110. For example, login/configuration module 320 may perform a login procedure to initially connect user device 114 to event server 138 via LAN 130 or via Internet 150. In the FIG. 3 embodiment, login/configuration module 320 may preferably initially provide an access code and other user data 318 to event server 138 which may responsively send appropriate configuration information to user device 114. Login/configuration module 320 may then perform a configuration procedure by utilizing the downloaded configuration information from event server 138 to effectively configure user device 114 in an optimal manner for accessing event server 138 in conjunction with a particular event at a corresponding event location.

In the FIG. 3 embodiment, download module 322 may preferably download and install appropriate application software 312 and other software for use at a particular event or event location. Download module 322 may also initially determine whether a version of the application software 312 or other software already exists on user device 114, and may then perform an update procedure if the current version of application software 312 or other software is outdated.

In the FIG. 3 embodiment, profile module 324 may preferably create, edit, and manage one or more user profiles that may be transmitted to event server 138 during a login procedure. Profile module 324 may also maintain a list of profile recipients that have previously received one or more different user profiles from profile module 324. User profiles are further discussed below in conjunction with FIG. 4.

In the FIG. 3 embodiment, access rights module 326 may preferably communicate with event server 138 regarding access rights of user device 114. For example, access rights module 326 may preferably receive one or more time-stamped access capabilities for various services on event server 138. Access rights module 326 may also receive an encryption key for decrypting content information and other information that has been encrypted by event server 138 prior to transmission to user device 114. Access rights are further discussed below in conjunction with FIG. 4.

In the FIG. 3 embodiment, streaming services 328 may preferably support receiving, processing, and displaying various types of streaming content (such as audio or video information) from event server 138. Similarly, metadata module 330 may preferably support receiving, processing, and displaying various types of metadata information from event server 138. For example, metadata module 330 may manage and provide various types of ancillary information that is related to a particular event, such as event participant statistics or other background information.

In the FIG. 3 embodiment, game module 332 may include any appropriate type of interface for utilizing user device 114 to participate in one or more game services on event server 138. User communication module 334 may preferably be utilized by a system user of user device 114 to selectably communicate with other game participants through their respective user devices 114. For example, user communication module 334 may support communications by text messages or by audio headset.

In the FIG. 3 embodiment, certificate handling module 336 may preferably coordinate various functions for receiving and sending certificates in electronic system 110. For example, certificate handling module 336 may manage various security procedures for transferring the foregoing certificates. Certificates are further discussed above in conjunction with FIGS. 8 and 11. Certificate repository module 338 may preferably include effective means for storing, managing, and accessing various certificates that are received by user device 114.

In the FIG. 3 embodiment, trading module 340 may preferably be utilized by a system user of user device 114 for trading or otherwise transferring various digital objects to other system users of user devices 114 in electronic system 110. For example, a system user may utilize trading module 340 and certificate handling module 336 for performing a transfer procedure to thereby transfer a certificate from certificate repository module 338 to a user device 114 of another system user in electronic system. Trading module 340 may utilize any effective method to perform the transfer procedure. For example, a source user device 114 may transfer a certificate directly to a target user device 114. Alternately, the source user device 114 may utilize event server 138 or another transfer authentication entity to transfer a certificate to the target user device 114.

Figure 4:
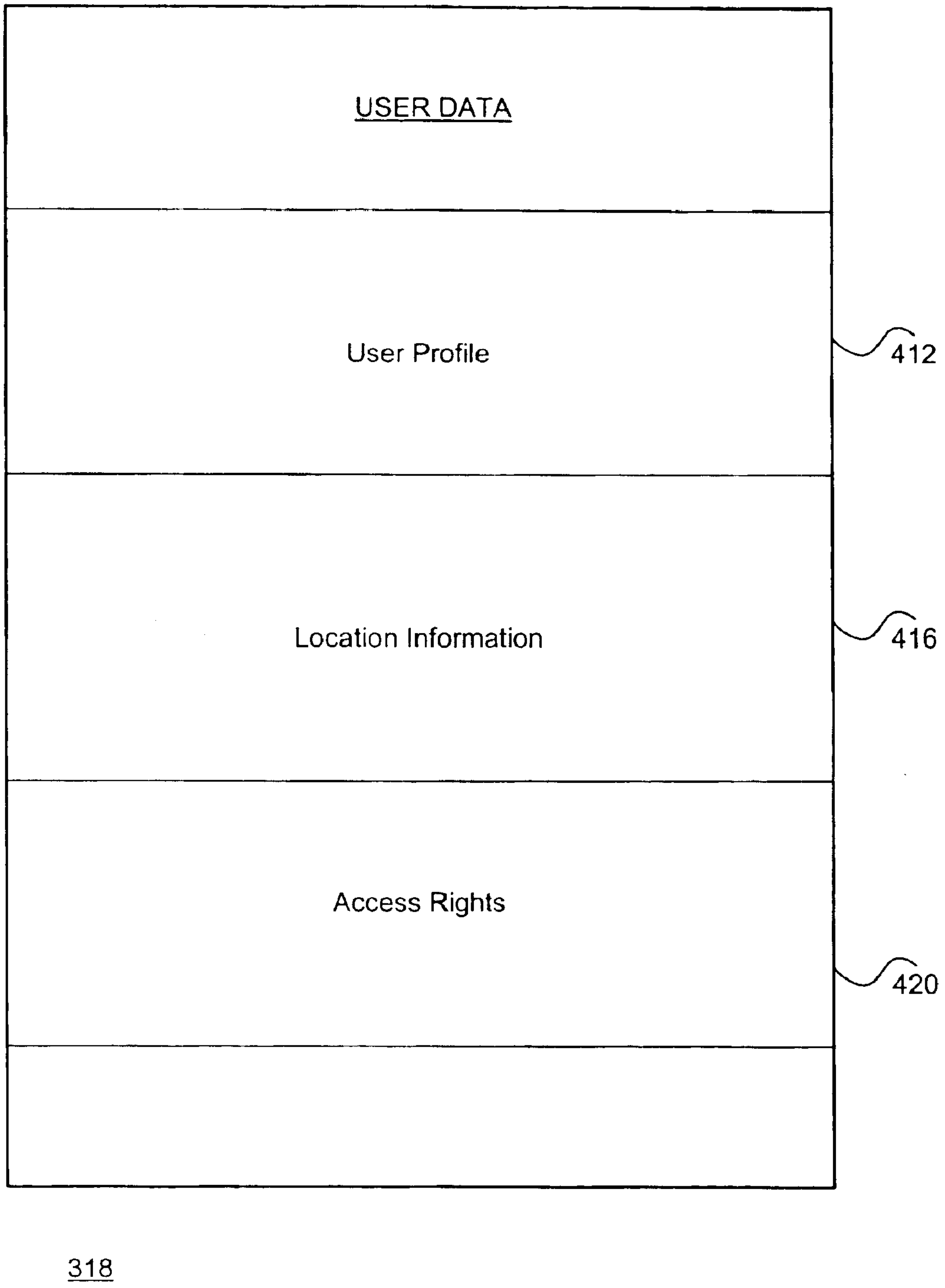
FIG. 4 is a block diagram for one embodiment of the user data of FIG. 3, in accordance with the present invention.

Referring now to FIG. 4, a block diagram for one embodiment of the FIG. 3 user data 318 is shown, in accordance with the present invention. In the FIG. 4 embodiment, user data 318 may include, but is not limited to, one or more user profiles 412, location information 416, and access rights 420. In alternate embodiments, user data 318 may readily include various other components in addition to, or instead of, those components discussed in conjunction with the FIG. 4 embodiment.

In the FIG. 4 embodiment, user profiles 412 may include any information related to a system user of user device 114. In certain embodiments, user profiles 412 may include a basic device profile that only describes basic functionality of user device 114. The foregoing device profile may typically be provided to event server 138 to gain access by a single user device 114 to basic services and content information.

In the FIG. 4 embodiment, user profiles 412 may also include one or more authentic user profiles that selectively describe various personal characteristics and usage traits of a particular system user of user device 114. In accordance with the present invention, user profiles 412 may also include one or more virtual user profiles that selectively describe various personal characteristics and usage traits of a fictitious system user of user device 114. In the FIG. 4 embodiment, user profiles 412 may also include one or more location profiles that describe a system configuration of a particular location (such as a system user's home network) to enable event server 138 to provide appropriate services and content information based upon a particular location profile.

In the FIG. 4 embodiment, location information 416 may preferably include any relevant information pertaining to one or more particular event locations. Location information 416 may be obtained in any suitable manner. For example, location information 416 may be provided by a system user by utilizing user interface 214 (FIG. 2). In accordance with the present invention, location information 416 may be provided to event server 138 in order to facilitate access to appropriate services and content information related to a corresponding event location.

In the FIG. 4 embodiment, access rights 420 may include one or more access codes for logging onto event server 138. Access codes may be obtained in any effective manner. For example, a system user may obtain an access code when purchasing admission to a particular event, and may responsively enter the access code using user interface 214. Alternately, an access code may be electronically transferred to user device 114. For example, a wireless "beaming" technique may utilize infrared or radio-frequency transmission to provide an access code to user device 114. Each of the foregoing access codes may preferably be associated with one or more time-stamped access capabilities for accessing corresponding services and content information from event server 138.

Figure 5:
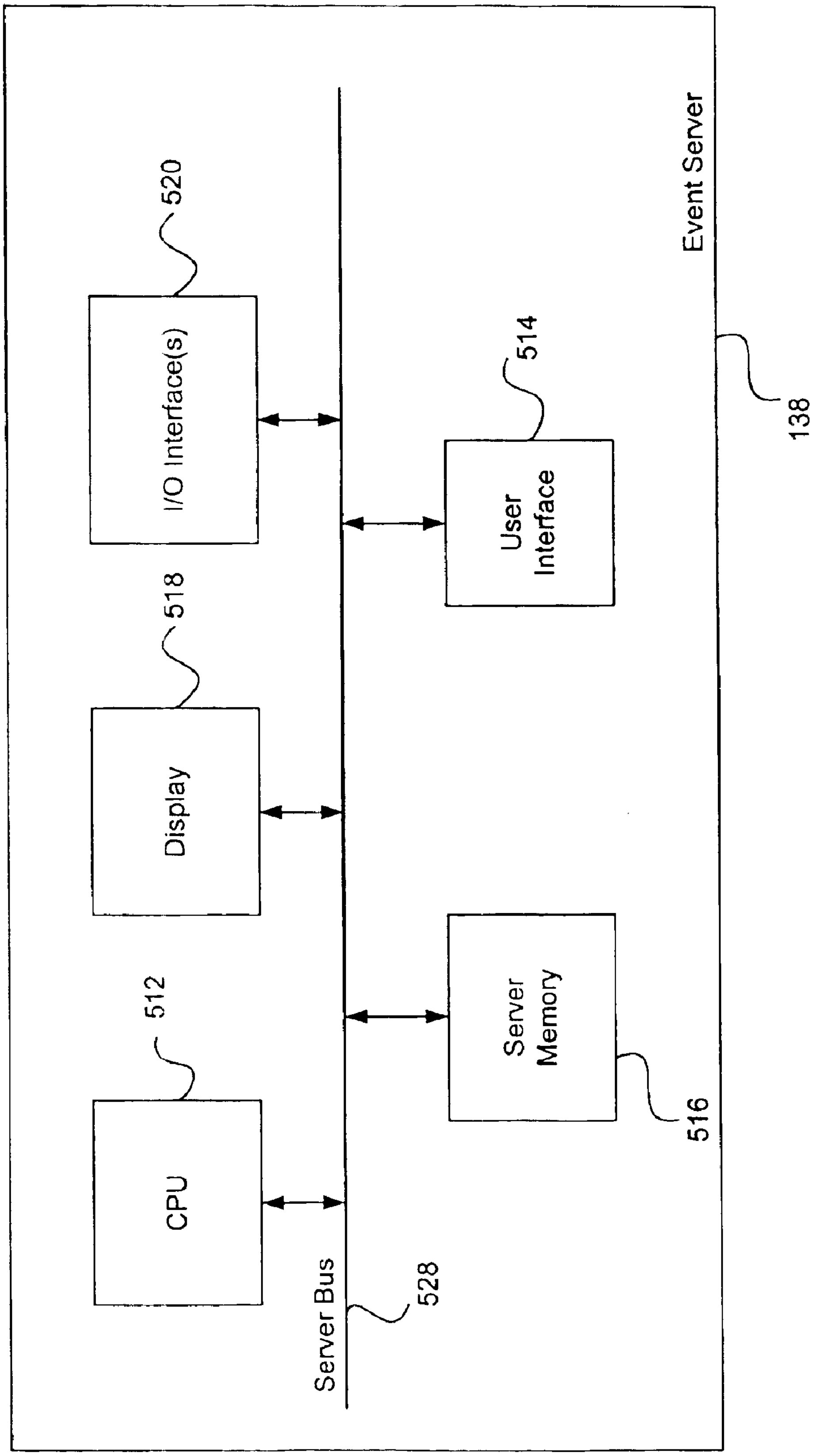
FIG. 5 is a block diagram for one embodiment of the event server of FIG. 1, in accordance with the present invention.

Referring now to FIG. 5, a block diagram for one embodiment of the FIG. 1 event server 138 is shown, in accordance with the present invention. In the FIG. 5 embodiment, event server 138 preferably includes, but is not limited to, a central processing unit (CPU) 512, a user interface 514, a server memory 516, a display 518, and one or more input/output interface(s) (I/O interface(s)) 520. The foregoing components of event server 138 may preferably be coupled to, and communicate through, a server bus 528.

In alternate embodiments, event server 138 may readily be implemented using various components and configurations in addition to, or instead of, those discussed in conjunction with the FIG. 5 embodiment. In the FIG. 5 embodiment, CPU 512 may be implemented to include any appropriate and compatible microprocessor device that preferably executes software instructions to thereby control and manage the operation of event server 138. The FIG. 5 display 518 preferably may include any effective type of display technology including a cathode-ray-tube monitor or a liquid-crystal display device.

In the FIG. 5 embodiment, I/O interface(s) 520 preferably may include one or more input and/or output interfaces to receive and/or transmit any required types of information by event server 138. For example, in the FIG. 5 embodiment, event server 138 may utilize I/O interface(s) 520 to bi-directionally communicate with various types of wireless communications devices through a wireless communications interface. The wireless communications interface may preferably include any effective means to remotely communicate with an external entity such as LAN 130 (FIG. 1) or Internet 150, to thereby exchange relevant information for successful operation of event server 138.

In addition, event server 138 may utilize the wireless communications interface to download various types of information and other data from a wireless source such as user devices 114 (FIG. 1). The foregoing wireless communications interface may be implemented using any appropriate wireless technology, including radio-frequency transmission, infra-red transmission, or micro-wave transmission.

In the FIG. 5 embodiment, event server 138 may also utilize I/O interface(s) 520 to bi-directionally communicate with one or more distributed computer networks. For example, event server 138 may advantageously communicate with the Internet, a local area network such as LAN 130, or other distributed computer networks to upload or download various types of information.

In the FIG. 5 embodiment, server memory 516 may be implemented to include any combination of desired storage devices, including, but not limited to, read-only memory (ROM), random-access memory (RAM), and various types of non-volatile memory, such as floppy disks or hard disks. The contents and functionality of server memory 516 are further discussed below in conjunction with FIG. 6.

In the FIG. 5 embodiment, user interface 514 may preferably include any effective means to allow a system user to communicate with event server 138. For example, user interface 514 may support a keyboard device, a display device, and/or other devices. The functionality and utilization of event server 138 is further discussed below in conjunction with FIGS. 9 through 11.

Figure 6:
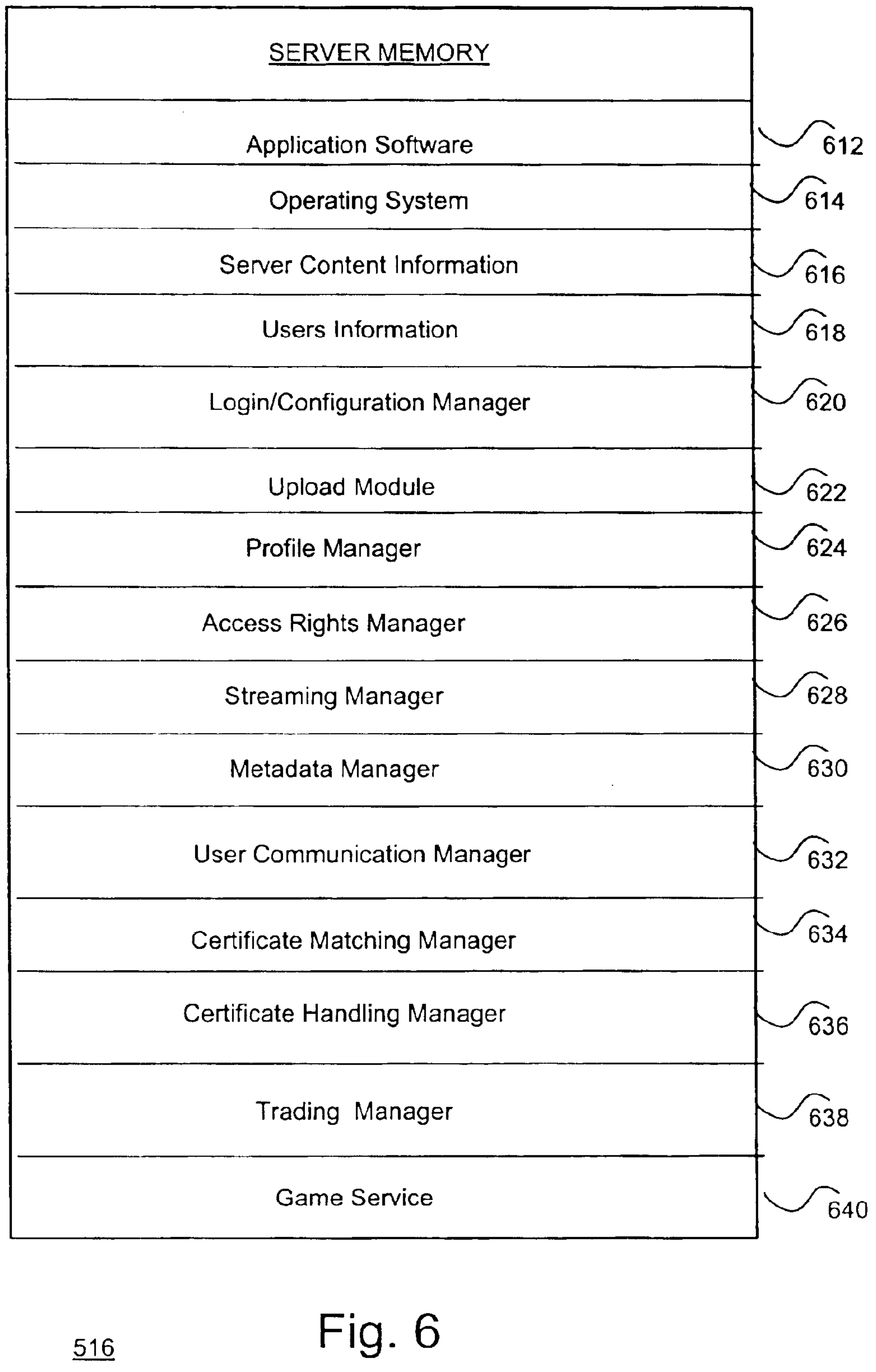
FIG. 6 is a block diagram for one embodiment of the server memory of FIG. 5, in accordance with the present invention.

Referring now to FIG. 6, a block diagram for one embodiment of the FIG. 5 server memory 516 is shown, in accordance with the present invention. In the FIG. 6 embodiment, server memory 516 preferably includes, but is not limited to, application software 612, an operating system 614, server content information 616, users information 618, a login/configuration manager 620, an upload module 622, a profile manager 624, an access rights manager 626, a streaming manager 628, a metadata manager 630, a user communication manager 632, a certificate matching manager 634, a certificate handling manager 636, a trading manager 638, and at least one game service 640. In alternate embodiments, server memory 516 may readily include various other components in addition to, or instead of, those components discussed in conjunction with the FIG. 6 embodiment.

In the FIG. 6 embodiment, application software 612 may include program instructions that are preferably executed by CPU 512 (FIG. 5) to perform various functions and operations for event server 138. The particular nature and functionality of application software 612 preferably varies depending upon factors such as the specific type and particular use of the corresponding event server 138. In the FIG. 6 embodiment, operating system 614 preferably controls and coordinates low-level functionality of event server 138. Server content information 616 preferably includes various types of data and services that are preferably stored in server memory 516. Users information 618 may preferably include information pertaining to various systems users.

In the FIG. 6 embodiment, login/configuration manager 620 may preferably manage bi-directional communications between event server 138 and another entity in electronic system 110. For example, login/configuration manager 620 may participate in a login procedure to initially connect a user device 114 to event server 138 via LAN 130 or via Internet 150 (see FIG. 1). In the FIG. 6 embodiment, login/configuration manager 620 may preferably initially receive an access code and other user data 318 from a user device 114. Login/configuration manager 620 may then preferably participate in a configuration procedure by responsively providing appropriate configuration information to the particular user device 114. The user device 114 may then utilize the configuration information to effectively configure the user device 114 in an optimal manner for accessing event server 138 in conjunction with a particular event at a corresponding event location.

In the FIG. 6 embodiment, upload module 622 may preferably provide appropriate device application software 312 (FIG. 2) or other software for use at a particular event or event location to user device 114. In the FIG. 6 embodiment, profile manager 624 may preferably manage and utilize one or more user profiles 412 that may be transmitted to event server 138 during a login procedure. Profile manager 624 may also maintain a list of one or more location profiles that each correspond to a particular event location. Event server 138 may preferably utilize the location profiles in conjunction with location information 416 (FIG. 4) from a user device 114 to provide appropriate server content information to a user device 114.

In the FIG. 6 embodiment, access rights manager 626 may preferably communicate with user device 114 regarding access rights of a particular system user. For example, access rights manager 626 may preferably provide one or more time-stamped access capabilities to user device 114 for various services on event server 138. Access rights manager 626 may also provide an encryption key for decrypting content information that has been encrypted by event server 138 prior to transmission to user device 114.

In the FIG. 6 embodiment, streaming manager 628 may preferably support processing and transmitting various types of streaming content from event server 138. Similarly, metadata manager 630 may preferably support processing and transmitting various types of metadata information from event server 138. For example, metadata manager 630 may manage and provide various types of ancillary information that is related to a particular game or event, such as event participant statistics or other background information.

In the FIG. 6 embodiment, user communication manager 632 may preferably be utilized by event server 138 to selectably support communications between various system users through their respective user devices 114. For example, user communication manager 632 may support communications by text messages or by audio headset.

In the FIG. 6 embodiment, certificate matching manager 634 may preferably provide coordination services to match various certificates with a compatible game service. Certificate handling manager 636 may preferably coordinate various functions for receiving and sending certificates through event server 138. For example, certificate handling manager 636 may manage various security procedures for transferring the foregoing certificates.

In the FIG. 6 embodiment, trading manager may preferably be utilized by system users of user devices 114 for trading or otherwise transferring various digital objects to other system users of user devices 114 in electronic system 110. For example, a system user may utilize trading manager 638 and certificate handling manager 634 for performing a transfer procedure to thereby transfer a certificate from a source user device 114 to a target user device 114 in electronic system 110. In the FIG. 6 embodiment, game service 640 may support systems users of user devices 114 to participate in one or more electronic games. One embodiment of game service 640 is further discussed below in conjunction with FIG. 7.

Figure 7:
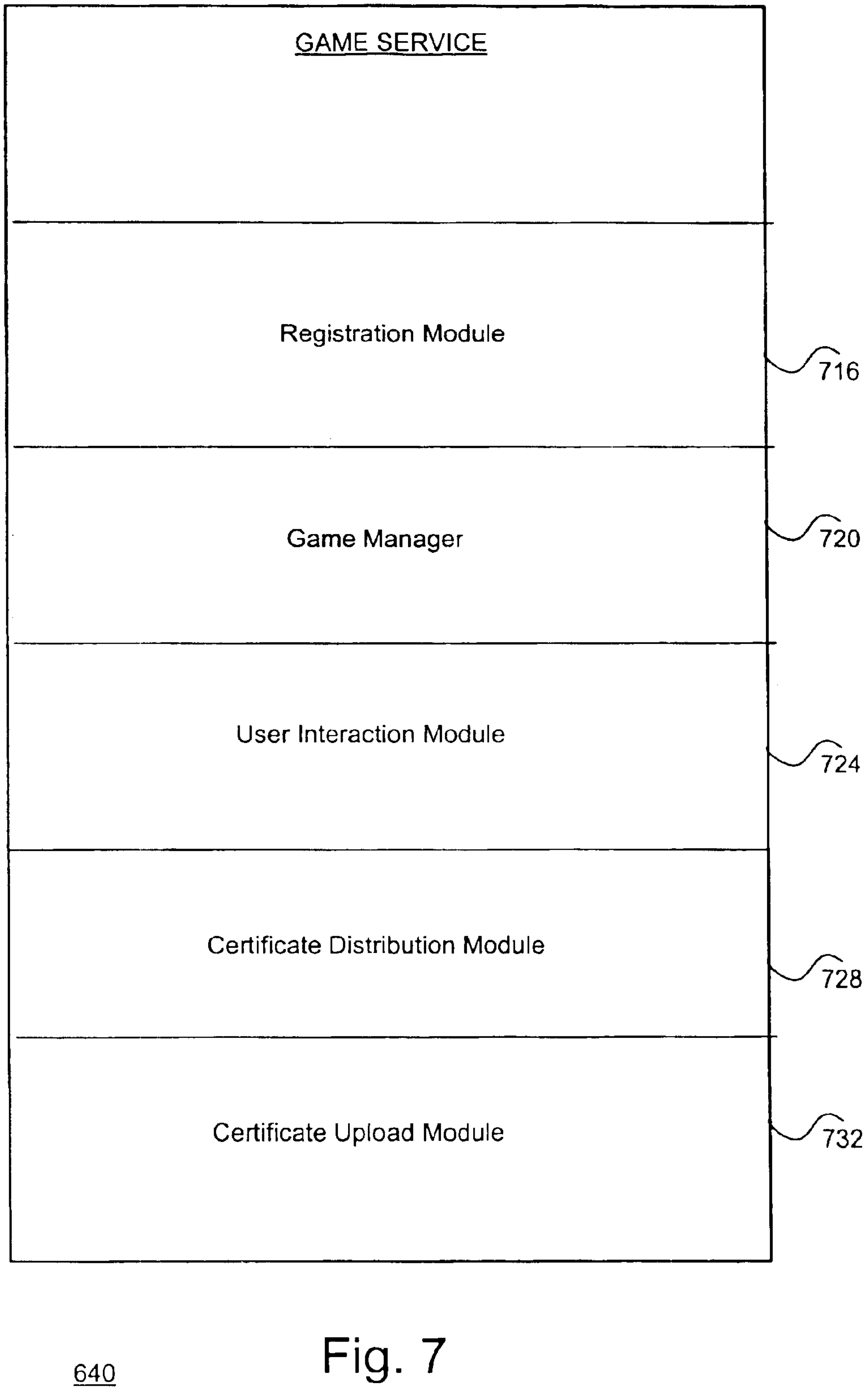
FIG. 7 is a block diagram for one embodiment of the game service of FIG. 6, in accordance with the present invention.

Referring now to FIG. 7, a block diagram for one embodiment of the FIG. 6 game service 640 is shown, in accordance with the present invention. In the FIG. 7 embodiment, game service 640 may preferably include, but is not limited to, a registration module 716, a game manager 720, a user interaction module 724, a certificate distribution module 728, and a certificate upload module 732. In alternate embodiments of the present invention, game service 640 may readily be implemented to include various other configurations, and may also include various items and components that are different from those discussed in conjunction with the FIG. 7 embodiment.

In the FIG. 7 embodiment, registration module 716 may preferably register system users of various user devices 114 as participants in a given game that is supported by game service 640. Game manager 720 may preferably control and manage various functions of a given game that is supported by game service 640. The particular functionality of game manager 720 typically depends upon the type of game that is supported by game service 640.

In the FIG. 7 embodiment, user interaction module 724 may preferably coordinate communications between selected participants in a game that is supported by game service 640. Certificate distribution module 728 may preferably award certificates to certain game participants according to predetermined award criteria. In certain embodiments, certificate distribution module 728 may identify one or more award winners, create corresponding award certificates, encrypt the certificates, and transmit the certificates to appropriate user devices 114. In the FIG. 7 embodiment, certificate upload module 732 may support uploading various types of certificates from user devices 114 in electronic system 110 to event server 138. For example, a particular system user may upload a certificate to event server 138 for obtaining certain gaming benefits in return for surrendering the uploaded certificate.

Figure 8:
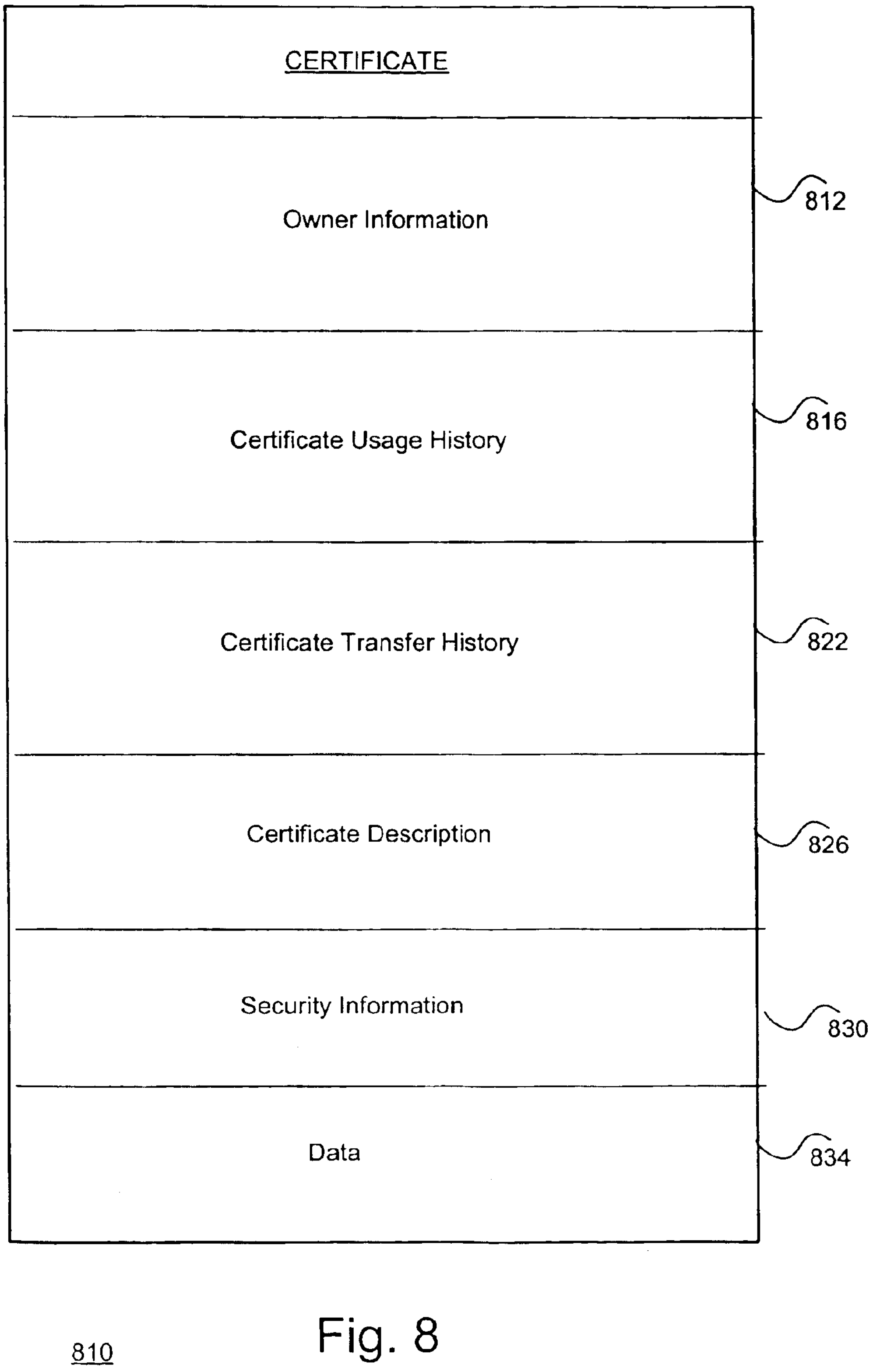
FIG. 8 is a block diagram for one embodiment of a certificate, in accordance with the present invention.

Referring now to FIG. 8, a block diagram for one embodiment of a certificate 810 is shown, in accordance with the present invention. In the FIG. 8 embodiment, certificate 810 may preferably include, but is not limited to, owner information 812, certificate usage history 816, certificate transfer history 822, certificate description 826, security information 830, and data 834. In alternate embodiments, certificate 810 may readily be implemented using various components and configurations in addition to, or instead of, those discussed in conjunction with the FIG. 8 embodiment.

In the FIG. 8 embodiment, certificate 810 may preferably be implemented as an electronic certificate that may include any type of authenticated digital data. For example, a certificate 810 may represent a game prize, membership information, a coupon, or an object for use in a particular game. In the FIG. 8 embodiment, owner information 812 may preferably include any type of information that identifies or corresponds to an owner of a particular certificate 810. In accordance with the present invention, owner information 812 may preferably be updated when a corresponding certificate 810 is transferred to a different owner.

Certificate usage history 816 may preferably include a chronological listing of various uses of a corresponding certificate 810. For example, certificate 810 may represent a specific game object, and certificate usage history 816 may include selected noteworthy gaming events in which the foregoing game object played a significant role. Certificate transfer history 822 may preferably include a chronological listing of ownership transfers of a corresponding certificate 810. In accordance with the present invention, certificate transfer history 822 may preferably be updated when a corresponding certificate 810 is transferred to a different owner.

In the FIG. 8 embodiment, certificate description 826 may include any appropriate information for describing a corresponding certificate 810. In accordance with the present invention, certificate description 826 may be utilized to effectively authenticate a particular certificate 810. Security information 830 may preferably include any type of information for ensuring that a corresponding certificate 810 remains secure. Security information 830 may therefore support various means to exclude unauthorized persons or entities from accessing certificate 810 or any related information that certificate 810 represents. For example, security information may include authentication information or encryption information.

In the FIG. 8 embodiment, data 834 may include any type of specific information that is represented by or correspond to certificate 810. For example, data 834 may include a digital object or element for use in a particular game that is supported by gaming service 640. In certain embodiments of certificate 810, data 834 may be an optional element that may not always be included as part of certificate 810.

Figure 9:
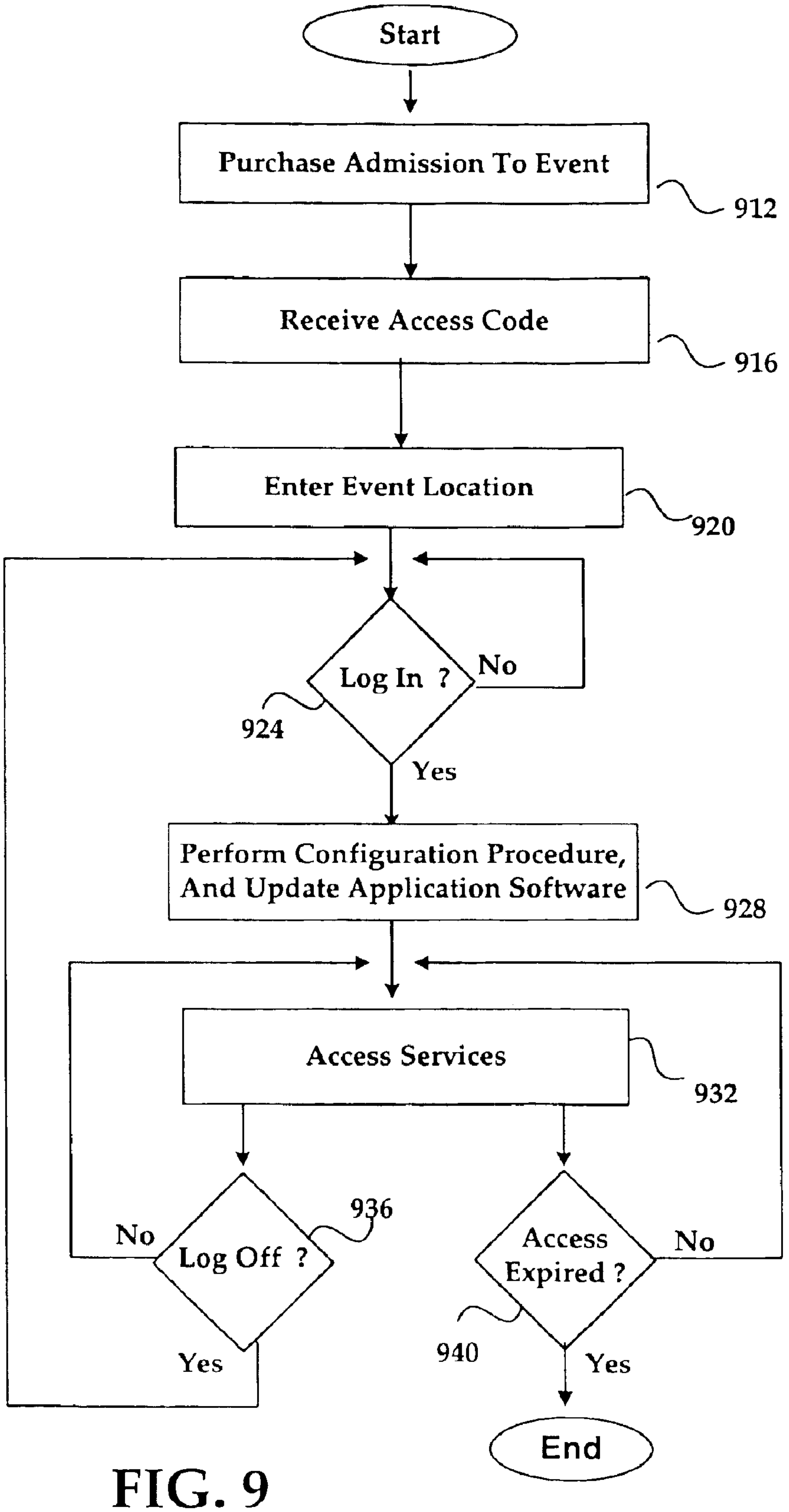
FIG. 9 is a flowchart of method steps for selectively providing information to a user device, in accordance with one embodiment of the present invention.

Referring now to FIG. 9, a flowchart of method steps for selectively providing information to a user device 114 is shown, in accordance with one embodiment of the present invention. The FIG. 9 example is presented for purposes of illustration, and, in alternate embodiments, the present invention may readily utilize various other steps and sequences than those discussed in conjunction with the FIG. 9 embodiment.

In the FIG. 9 embodiment, initially, in step 912, a system user may preferably purchase an admission to a particular event or event location. Then, in step 916 the system user may preferably receive an access code corresponding to the particular event or event location. In step 920, the system user may preferably enter the event location.

Next, in step 924, the system user may preferably determine whether to perform a login procedure with user device 114 to thereby gain access to event server 138. During the login procedure, user device 114 may preferably provide the foregoing access code received in step 916 to event server 138. In certain embodiments, user device 114 may also provide other user data 318 to event server 138.

In step 928, user device 114 may preferably perform a configuration procedure with configuration information downloaded from event server 138. In addition, when appropriate, user device 114 may also update application software 312 and other software to correspond to a latest software version for the event or event location. Then, in step 932, user device 114 may preferably access and utilize various services and content information from event server 138. For example, a user device 114 may access event server 138 to participate in various electronic gaming services. In the FIG. 9 embodiment, event server 138 may preferably regulate access to various services and content information based upon time-stamped access capabilities corresponding to the access code provided by user device 114 to event server 138 during the foregoing login procedure. In certain embodiments, a system user may utilize user device 114 to provide various types of user feedback to event server 138 regarding a current event or event location. In addition, a system user may also communicate with event server 138 to perform various event-related activities such as ordering admission tickets or event notifications for future events.

In step 936, the system user may preferably determine whether to perform a logoff procedure with user device 114 to thereby terminate access to event server 138. If the system user determines to perform a logoff procedure, then the FIG. 9 process may preferably return to foregoing step 924 until the system user initiates another login procedure. Alternately, in step 940, event server 138 may periodically determine whether access rights for the user device 114 have expired. In the FIG. 9 embodiment, access rights manager 626 of event server 138 may preferably monitor the time-stamped access capabilities of access rights 420 (FIG. 4) and users information 618 (FIG. 6) to determine whether the access rights of the particular user device 114 have expired. In the FIG. 9 embodiment, when event server 138 determines that the access rights of the particular user device 114 have expired, then the FIG. 9 process may preferably terminate.

Figure 10:
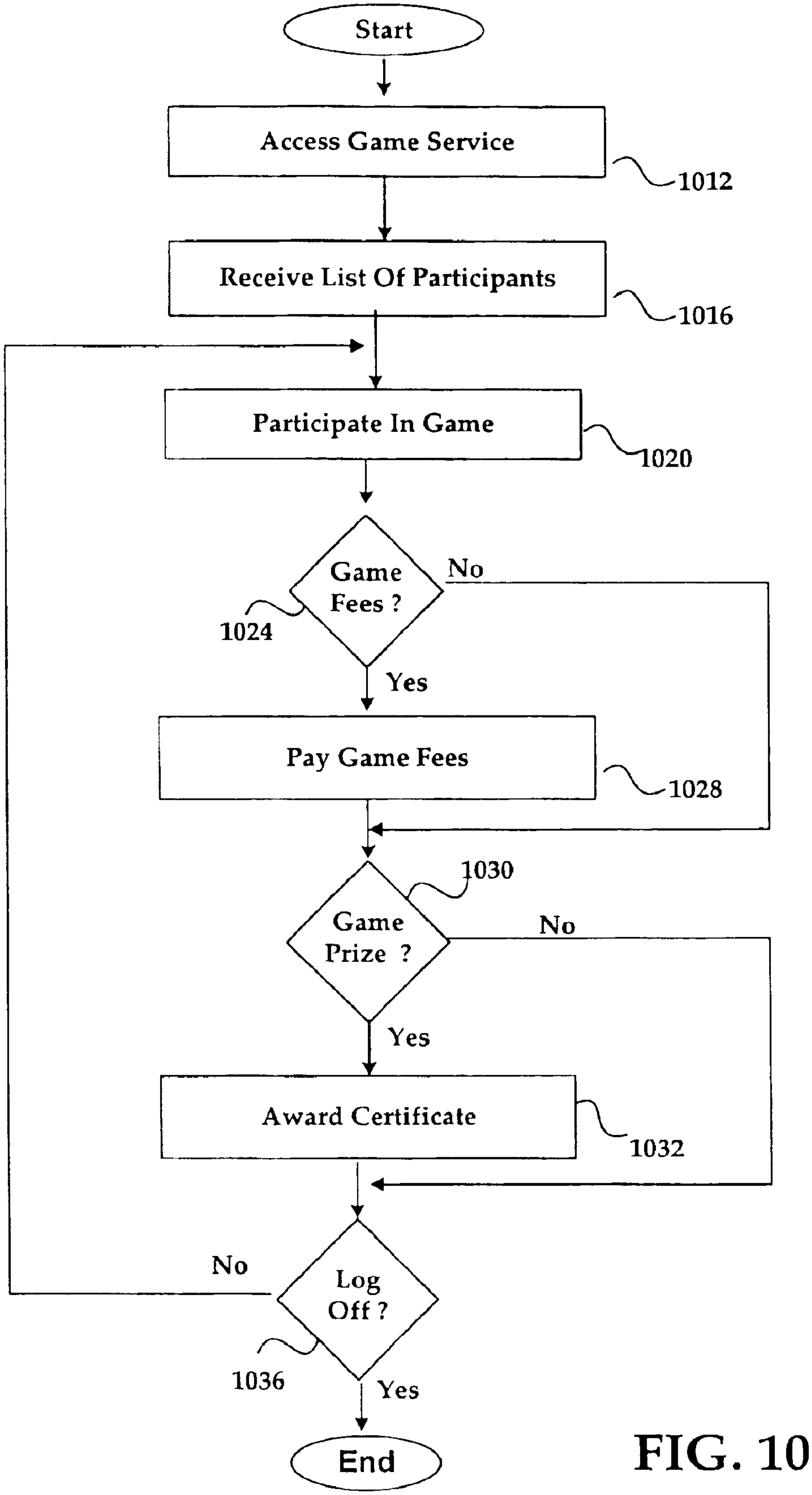
FIG. 10 is a flowchart of method steps to support gaming in an electronic network, in accordance with one embodiment of the present invention.

Referring now to FIG. 10, a flowchart of method steps for supporting gaming in an electronic network is shown, in accordance with one embodiment of the present invention. The FIG. 10 example is presented for purposes of illustration, and, in alternate embodiments, the present invention may readily utilize various other steps and sequences than those discussed in conjunction with the FIG. 10 embodiment.

In the FIG. 10 embodiment, in step 1012, a system user may preferably utilize a user device 114 to access a game service 640 for a particular game on event server 138. In response, in step 1016, the user device 114 may preferably receive a listing of current game participants from event server 138. Then, in step 1020, the foregoing system user may utilize user device 114 to participate in the particular game that is supported by game service 640.

In step 1024, the system user may utilize user device 114 to determine whether any game fees are required. If no game fees are required, then the FIG. 10 process may advance to step 1030. However, if the system user determines that game fees are required in foregoing step 1024, then in step 1028, the system user may preferably pay the game fees using any appropriate means. For example, the system user may utilize user device 114 to pay game fees through event server 138. In certain embodiments of the present invention, the foregoing game fees may preferably include various types of gambling activities such as placing wagers or otherwise betting on aspects of the game supported by the game service. A system user may also utilize a similar technique for gambling on various aspects of a particular live event.

In the FIG. 10 embodiment, in step 1030, event server 138 may preferably determine whether selected award criteria have been satisfied for awarding a game prize to one or more system users of user devices 114. If the particular award criteria have not been satisfied, then the FIG. 10 process may advance to step 1036. However, if the award criteria have been satisfied in foregoing step 1030, then in step 1032, event server 138 may preferably award a certificate to appropriate system users through respective user devices 114. In step 1036, the system user determines whether to logoff of the game service 640 on event server 138. If the system user determines to logoff of game service 640, then the FIG. 10 process may preferably terminate. However, if the system user determines not to logoff of game service 640, then the FIG. 10 process may preferably return to foregoing step 1020, and the system user may continue participating in the game supported by game service 640.

Figure 11:
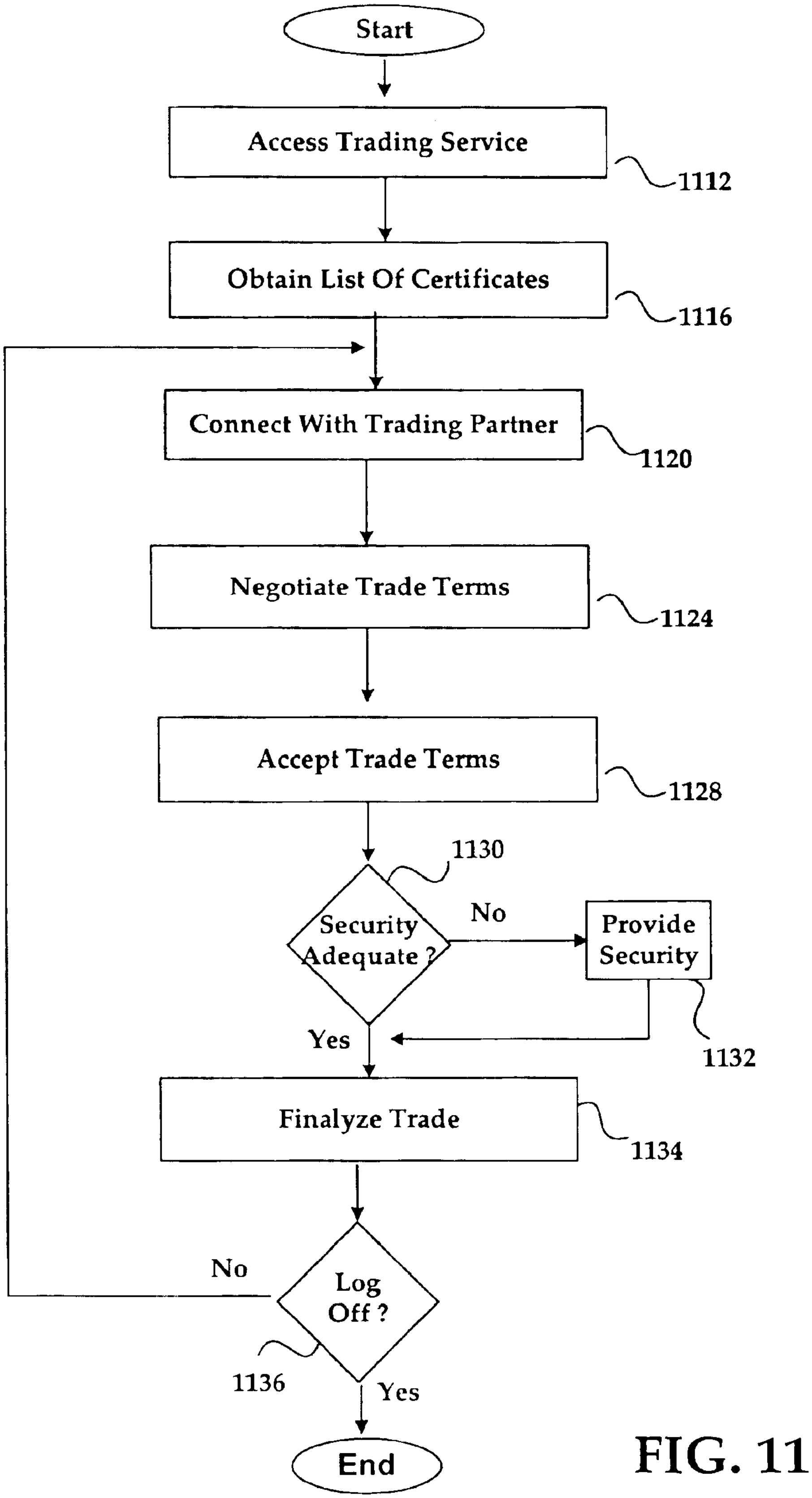
FIG. 11 is a flowchart of method steps for performing a transfer procedure, in accordance with one embodiment of the present invention.

Referring now to FIG. 11, a flowchart of method steps for performing a transfer procedure is shown, in accordance with one embodiment of the present invention. The FIG. 11 example is presented for purposes of illustration, and, in alternate embodiments, the present invention may readily utilize various other steps and sequences than those discussed in conjunction with the FIG. 11 embodiment.

In the FIG. 11 embodiment, in step 1112, a system user may utilize a source user device 114 to access a trading service for performing a transfer procedure to thereby transfer one or more certificates 810 to a target user device 114 of another system user in electronic system 110. The target and source user devices 114 may utilize separate trading modules 340 and certificate handling modules 336 to support the foregoing trading service. In accordance with the present invention, the system user may perform the foregoing transfer procedure in any effective manner. For example, the transfer procedure may be conducted through event server 138, or may occur directly from the source user device 114 to the target user device 114.

In step 1116, the source user device 114 may preferably obtain a list of certificates 810 that are currently stored by certificate repository module 338. Then, in step 1120, the source user device 114 may preferably locate and connect with a trading partner through target user device 114. In accordance with the present invention, locating and connecting with a trading partner may occur either face-to-face or remotely through event server 138. In step 1124, the system users/trading partners may preferably negotiate satisfactory trade terms for the transfer procedure. Again, negotiating trade terms may occur either face-to-face or remotely through event server 138.

In step 1128, the system users/trading partners may preferably utilize source user device 114 and target user device 114 to formally accept the trade terms that were previously negotiated in foregoing step 1124. In step 1130, source user device 114 and target user device 114 may preferably determine whether current security provisions are adequate for completing the transfer procedure. For example, source user device 114 and target user device 114 may determine whether appropriate versions of encryption software are currently installed to support the transfer procedure.

If current security provisions are adequate for completing the transfer procedure, then the FIG. 11 process may preferably advance to step 1134. However, if current security provisions are not adequate for completing the transfer procedure, then in step 1132, source user device 114 and target user device 114 may preferably obtain adequate security provisions for the transfer procedure. For example, source user device 114 and target user device 114 may access event server 138 or another entity to download appropriate encryption software for performing the transfer procedure.

In step 1134, source user device 114 and target user device 114 may preferably complete the transfer procedure and thereby finalyze the trade by transferring ownership rights of the particular certificate 810 from the system user of source device 114 to the system user of target device 114. In the FIG. 11 embodiment, the particular certificate 810 may be updated to reflect the change of ownership rights. In step 1136, the system user of source device 114 may preferably determine whether to logoff of the foregoing trading service. If the system user determines to logoff of the trading service, then the FIG. 11 process may preferably terminate. However, if the system user determines not to logoff the trading service, then the FIG. 11 process may preferably return to foregoing step 1120, and the system users/trading partners may decide to initiate another transfer procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for supporting electronic gaming, comprising: an event server configured to manage a game service, said event server providing a restricted access to said game service over an electronic network; and one or more user devices configured to communicate with said event server over said electronic network by performing a wireless communications procedure to thereby allow one or more system users to participate in said electronic gaming, said one or more system users each utilizing a respective one of said one or more user devices to perform a trading transaction for negotiating a transfer of ownership rights of an electronic certificate that represents a non-monetary based prize awarded as a part of said electronic gaming, said non-monetary based prize being unrelated to and unredeemable for money or monetary instruments, said trading transaction being conducted directly between a source device from said one or more user devices and a target device from said one or more user devices;

wherein said certificate includes owner information that identifies said ownership rights of said certificate, a certificate usage history that includes a chronological listing of various uses of said certificate, a certificate transfer history that includes a chronological listing of ownership transfers of said certificate, a certificate description that includes identification and authentication information for said certificate, security information that prevents unauthorized persons or entities from accessing said certificate, and data that includes at least one digital object that is related to said electronic gaming.

2. The system of claim 1 wherein said one or more user devices are implemented as at least one of a personal digital assistant device, a cellular telephone device, a computer device, and a portable wireless telecommunications device.

3. The system of claim 1 wherein said game service includes restricted information that is related to a particular electronic game, a specified event, an event location, and one or more participants in said specified event.

4. The system of claim 1 wherein said one or more user devices communicate with said event server through one or more wireless base station transceivers and one or more local area networks, said one or more user devices alternately communicating with said event server through a first direct path from said one or more local area networks, an indirect path from said one or more local area networks through an Internet network, and a second direct path from said user device directly through said Internet network.

5. The system of claim 1 wherein said one or more user devices each include a processor, a display, a device memory, a sound module, one or more user interfaces, and input/output interfaces, said input/output interfaces including a wireless communications interface, a network interface, and a removable memory interface, said device memory including application software, an operating system, device content information, user data, a login/configuration module for providing an access code to said event server, a download module for updating device software, a profile module, an access rights module, video streaming support services, a metadata module for managing ancillary data related to said game service, a game module, a user communication module, a certificate handling module, a certificate repository module, and a trading module.

6. The system of claim 1 wherein said event server includes a processor, a display, a server memory, one or more user interfaces, and input/output interfaces, said input/output interfaces including at least one of a wireless communications interface and a network interface, said server memory including application software, an operating system, server content information, users information, a login/configuration manager, an upload module for updating device software, a profile manager, an access rights manager for managing said restricted access to said game service, a video streaming manager, a metadata manager for managing ancillary data related to said game service, a user communication manager, a certificate matching manager, a certificate handling manager, a trading manager, and said game service.

7. The system of claim 1 wherein said game service includes a registration module for registering said one or more system users as game participants, a game manager, a user interaction module for supporting bi-directional communications between said one or more user devices, a certificate distribution module for awarding prize certificates to said one or more system users based upon predetermined award criteria, and a certificate upload module for receiving certificate uploads from said one or more user devices.

8. The system of claim 1 wherein said one or more system users utilize said one or more user devices to access and register with said game service, said event server responsively providing a list of current game participants to said one or more user devices, said one or more system users then participating in said electronic gaming.

9. The system of claim 8 wherein selected ones of said one or more system users utilize said one or more user devices to perform bi-directional communications only to said selected ones of said one or more system users during said electronic gaming by utilizing audio headsets and user interfaces on said one or more user devices.

10. The system of claim 8 wherein said one or more system users utilize said one or more user devices to pay game fees that are related to participating in said electronic gaming.

11. The system of claim 10 wherein said system users periodically utilize said one or more user devices to place wagers for gambling activities related to a live event, said wagers being of variable values depending upon wager amount choices selected by said system users.

12. The system of claim 10 wherein said event server determines whether to award a prize certificate to a selected one of said one or more system users based upon predetermined award criteria, said event server then creating said prize certificate, and transferring said prize certificate to said selected one of said one or more user devices.

13. The system of claim 1 wherein a source system user from said one or more system users utilizes a source user device to access a trading service for performing a transfer procedure to transfer said certificate to a target system user through a target user device.

14. The system of claim 13 wherein said source user device accesses a certificate list of one or more stored certificates that are currently located in a certificate repository module of said source user device.

15. The system of claim 13 wherein said source system user utilizes said source user device to locate and connect with said target system user through said target user device.

16. The system of claim 15 wherein said source system user and said target system user negotiate satisfactory trade terms for said transfer procedure, said source system user and said target system user then each formally accepting said satisfactory trade terms.

17. The system of claim 16 wherein said source user device and said target user device determine whether adequate security means are available for completing said transfer procedure, said source user device and said target user device downloading appropriate security software from said event server if said adequate security means are not currently available for completing said transfer procedure.

18. The system of claim 16 wherein said source user device and said target user device finalyze said transfer procedure by transferring said ownership rights of said certificate from said source system user to said target system user, said certificate being updated to reflect a change of said ownership rights.

19. The system of claim 13 wherein said transfer procedure is alternately performed using an indirect transfer path and a direct transfer path, said indirect transfer path passing from said source user device, through said event server, to said target user device, said direct transfer path passing directly from said source user device to said target user device.

20. A method for supporting electronic gaming, comprising the steps of:

managing a game service by utilizing an event server that provides a restricted access to said game service over an electronic network; and communicating with said event server over said electronic network by performing a wireless communications procedure with one or more user devices to thereby allow one or more system users to participate in said electronic gaming, said one or more system users each utilizing a respective one of said one or more user devices to perform a trading transaction for negotiating a transfer of ownership rights of an electronic certificate that represents a non-monetary based prize awarded as a part of said electronic gaming, said non-monetary based prize being unrelated to and unredeemable for money or monetary instruments, said trading transaction being conducted directly between a source device from said one or more user devices and a target device from said one or more user devices;

wherein said certificate includes owner information that identifies said ownership rights of said certificate, a certificate usage history that includes a chronological listing of various uses of said certificate, a certificate transfer history that includes a chronological listing of ownership transfers of said certificate, a certificate description that includes identification and authentication information for said certificate, security information that prevents unauthorized persons or entities from accessing said certificate, and data that includes at least one digital object that is related to said electronic gaming.

21. The method of claim 20 wherein said one or more user devices are implemented as at least one of a personal digital assistant device, a cellular telephone device, a computer device, and a portable wireless telecommunications device.

22. The method of claim 20 wherein said game service includes restricted information that is related to a particular electronic game, a specified event, an event location, and one or more participants in said specified event.

23. The method of claim 20 wherein said one or more user devices communicate with said event server through one or more wireless base station transceivers and one or more local area networks, said one or more user devices alternately communicating with said event server through a first direct path from said one or more local area networks, an indirect path from said one or more local area networks through an Internet network, and a second direct path from said user device directly through said Internet network.

24. The method of claim 20 wherein said one or more user devices each a processor, a display, a device memory, a sound module, one or more user interfaces, and input/output interfaces, said input/output interfaces including a wireless communications interface, a network interface, and a removable memory interface, said device memory including application software, an operating system, device content information, user data, a login/configuration module for providing an access code to said event server, a download module for updating device software, a profile module, an access rights module, video streaming support services, a metadata module for managing ancillary data related to said game service, a game module, a user communication module, a certificate handling module, a certificate repository module, and a trading module.

25. The method of claim 20 wherein said event server includes a processor, a display, a server memory, one or more user interfaces, and input/output interfaces, said input/ output interfaces including at least one of a wireless communications interface and a network interface, said server memory including application software, an operating system, server content information, users information, a login/configuration manager, an upload module for updating device software, a profile manager, an access rights manager for managing said restricted access to said game service, a video streaming manager, a metadata manager for managing ancillary data related to said game service, a user communication manager, a certificate matching manager, a certificate handling manager, a trading manager, and said game service.

26. The method of claim 20 wherein said game service includes a registration module for registering said one or more system users as game participants, a game manager, a user interaction module for supporting bi-directional communications between said one or more user devices, a certificate distribution module for awarding prize certificates to said one or more system users based upon predetermined award criteria, and a certificate upload module for receiving certificate uploads from said one or more user devices.

27. The method of claim 20 wherein said one or more system users utilize said one or more user devices to access and register with said game service, said event server responsively providing a list of current game participants to said one or more user devices, said one or more system users then participating in said electronic gaming.

28. The method of claim 27 wherein selected ones of said one or more system users utilize said one or more user devices to perform bi-directional communications only to said selected ones of said one or more system users during said electronic gaming by utilizing audio headsets and user interfaces on said one or more user devices.

29. The method of claim 27 wherein said one or more system users utilize said one or more user devices to pay game fees that are related to participating in said electronic gaming.

30. The method of claim 29 wherein said system users periodically utilize said one or more user devices to place wagers for gambling activities related to said electronic gaming, said wagers being of variable values depending upon wager amount choices selected by said system users.

31. The method of claim 29 wherein said event server determines whether to award a prize certificate to a selected one of said one or more system users based upon predetermined award criteria, said event server then creating said prize certificate, and transferring said prize certificate to said selected one of said one or more user devices.

32. The method of claim 20 wherein a source system user from said one or more system users utilizes a source user device to access a trading service for performing a transfer procedure to transfer said certificate to a target system user through a target user device.

33. The method of claim 32 wherein said source user device accesses a certificate list of one or more stored certificates that are currently located in a certificate repository module of said source user device.

34. The method of claim 32 wherein said source system user utilizes said source user device to locate and connect with said target system user through said target user device.

35. The method of claim 34 wherein said source system user and said target system user negotiate satisfactory trade terms for said transfer procedure, said source system user and said target system user then each formally accepting said satisfactory trade terms.

36. The method of claim 35 wherein said source user device and said target user device determine whether adequate security means are available for completing said transfer procedure, said source user device and said target user device downloading appropriate security software from said event server if said adequate security means are not currently available for completing said transfer procedure.

37. The method of claim 35 wherein said source user device and said target user device finalyze said transfer procedure by transferring said ownership rights of said certificate from said source system user to said target system user, said certificate being updated to reflect a change of said ownership rights.

38. The method of claim 32 wherein said transfer procedure is alternately performed using an indirect transfer path and a direct transfer path, said indirect transfer path passing from said source user device, through said event server, to said target user device, said direct transfer path passing directly from said source user device to said target user device.

39. A system for supporting electronic gaming comprising:

an event server configured to manage a game service, said event server providing a restricted access to said game service over an electronic network; and one or more user devices configured to communicate with said event server over said electronic network by performing a wireless communications procedure to thereby allow one or more system users to participate in said electronic gaming, said one or more system users each utilizing a respective one of said one or more user devices to perform a trading transaction for negotiating a transfer of ownership rights of an electronic certificate that represents a non-monetary based prize awarded as a part of said electronic gaming, said non-monetary based prize being unrelated to and unredeemable for money or monetary instruments, said non-monetary based prize being implemented as a game object for use by said one or more system users as a gaming element in a particular computer game during said electronic gaming, said trading transaction being conducted directly between a source device from said one or more user devices and a target device from said one or more user devices;

wherein said certificate includes owner information that identifies said ownership rights of said certificate, a certificate usage history that includes a chronological listing of various uses of said certificate, a certificate transfer history that includes a chronological listing of ownership transfers of said certificate, a certificate description that includes identification and authentication information for said certificate, security information that prevents unauthorized persons or entities from accessing said certificate, and data that includes at least one digital object that is related to said electronic gaming.

* * * * *